United States Patent [19]

Toyosawa

[11] Patent Number: 5,056,677

[45] Date of Patent: Oct. 15, 1991

[54] SMALL ARTICLE HOLDERS

[75] Inventor: Manabu Toyosawa, Tokyo, Japan

[73] Assignee: Daiya Sangyo Co., Ltd., Tokyo, Japan

[21] Appl. No.: 606,906

[22] Filed: Oct. 31, 1990

[30] Foreign Application Priority Data

Nov. 9, 1989 [JP] Japan .................................. 1-130900
Jan. 19, 1990 [JP] Japan ...................................... 2-3832
May 17, 1990 [JP] Japan .................................... 2-51373

[51] Int. Cl.⁵ ............................................ B65D 5/32
[52] U.S. Cl. ................................. 220/4.21; 220/4.28; 220/476; 248/205.3
[58] Field of Search .................... 220/4.21, 4.24, 4.28, 220/8, 478; 248/205.3, 128, 146, 161, 419, 176

[56] References Cited

U.S. PATENT DOCUMENTS

| | | |
|---|---|---|
| 3,300,040 | 1/1967 | Ferguson .......................... 220/4.21 |
| 3,317,073 | 5/1967 | Woerner ........................... 220/4.21 |
| 3,957,327 | 5/1976 | Parrish ............................. 220/4.21 |
| 4,154,355 | 5/1979 | Shackelford ...................... 220/4.21 |
| 4,369,883 | 1/1983 | Stravitz ............................ 220/4.21 |
| 4,667,702 | 5/1987 | Roth ................................. 220/4.21 |
| 4,708,256 | 11/1987 | Intardonato ..................... 220/4.21 |
| 4,749,097 | 6/1988 | Rosman ............................ 220/4.21 |

Primary Examiner—Joseph Man-Fu Moy
Attorney, Agent, or Firm—Edmund M. Jaskiewicz

[57] ABSTRACT

Disclosed is a small article holder adapted to hold or support a small article such as a wrapping film case, a booklet or a kitchen gadget, which comprises a pair of holder bodies, each holder body having a supporting section for supporting a small article to be held, and means for securing the holder bodies to a fixed structure such as refrigerator located in a kitchen area, said securing means being fixed to the back surface of each of the holder bodies.

6 Claims, 16 Drawing Sheets

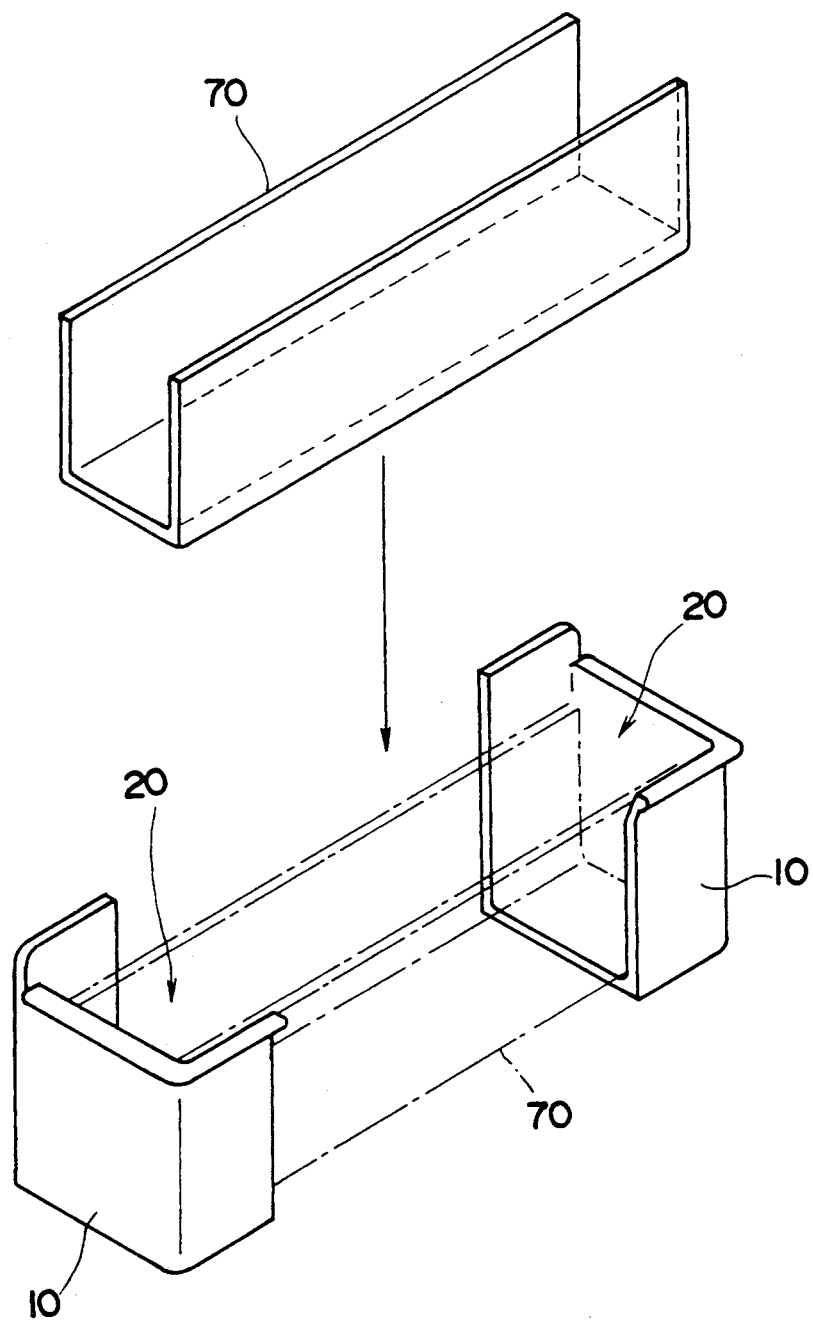
F I G. 8

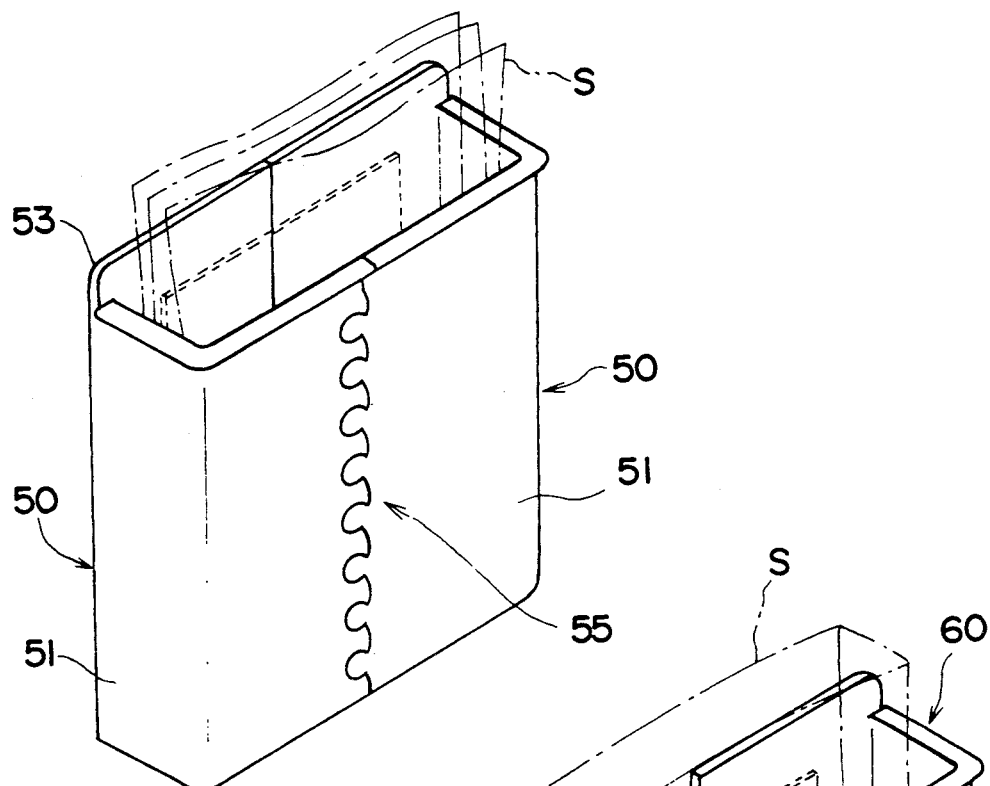
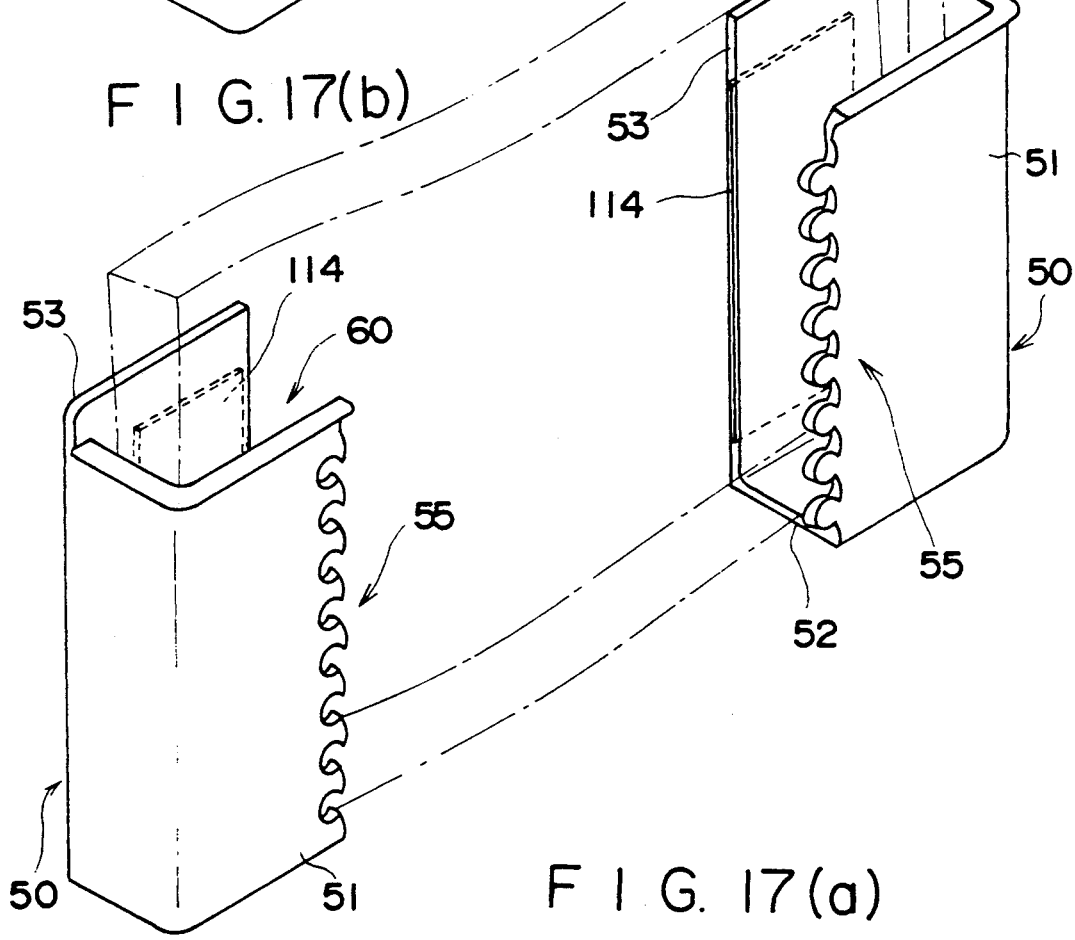
FIG. 17(b)
FIG. 17(a)

SMALL ARTICLE HOLDERS

BACKGROUND OF THE INVENTION

1. Field of the Invention

The present invention relates to a small article holder adapted to hold or support a small article such as a wrapping film case, a booklet or a kitchen gadget. Particularly, the present invention relates to a small article holder, which can be secured to a wall surface of a steel-made product or a refrigerator located in a kitchen area.

2. Description of the Related Art

Heretofore, as small article holder, various kinds of products have been produced depending upon the size and application of the small article to be supported.

FIGS. 19 and 20 show one of examples of a conventional small article holder, and are perspective views of the small article holder which can be mainly used as a wrapping film case holder.

In FIG. 19, a holder body 1 is provided with two holding members 2, the upper holding member 2a being made smaller than the lower holding member 2b. The holder body 1 is provided with suckers or sucking discs 3 on its back surface.

The small article holder having the above structure can hold two wrapping film cases different in length and size from each other in a horizontal direction, one being placed on the upper holding member 2a and the other being placed on the lower holding member 2b. The small article holder can be secured to a wall surface (not shown) of a steel-made product or a refrigerator located in a kitchen area. As used herein, the term "wrapping film case" includes a foil case having a rolled foil therein in addition to a wrapping film case having a rolled film therein.

In FIG. 20, a pocket-shaped holder body 4 is made from linear materials combined in the lattice-like shape. The wrapping film case can be held in a vertical position within the pocket of the holder body 4. The pocket is formed relatively long in a vertical direction so as to prevent the wrapping film case from being fallen. The holder body 4 is also provided with sucking discs, as is the same case with the holder shown in FIG. 19, on its back section so that the holder can be secured to a wall surface of a refrigerator or the like.

In the case of the above holders for supporting a wrapping film case, the size and the length of the holding section are pre-determined and formed depending upon the size of the wrapping film case to be supported. However, these conventional small article holders have the following disadvantages.

The holder as shown in FIG. 19 can hold the wrapping film case only in a horizontal direction, not in a vertical direction. The holder as shown in FIG. 20 can hold the wrapping film case only in a vertical direction. Thus, the conventional holders have restriction with regard to the direction of holding the wrapping film case, and are not capable of holding the wrapping film cases different in the size and the length thereof.

Therefore, there has been a problem that a wrapping film case cannot be held in a desired position with consideration of a layout of a kitchen area.

SUMMMARY OF THE INVENTION

An object of the present invention is to solve the above-mentioned problems, particularly to provide a small article holder capable of holding a wrapping film case in a desired direction.

Another object of the present invention is to provide a small article holder which can readily hold various small articles in addition to the wrapping film case.

Other objects and advantages of the present invention will be apparent from the following description and drawings.

Accordingly, to achieve the above objects, there is now provided a small article holder adapted to hold or support a small article, which comprises a pair of holder bodies, each holder body having a supporting section for supporting a small article to be held, and means for securing the holder bodies to a fixed structure, said securing means being fixed to the back surface of each of the holder bodies.

The size and shape of the supporting section are such that the supporting section can support the end of a wrapping film case, or to receive and hold the end of a booklet.

A bridging member having a "U"-shaped cross section can be detachably placed between a pair of the holder bodies.

Further, each holder body may be formed with fitting or engaging means for having the holder bodies securely engaged with each other at a place that faces each other.

BRIEF DESCRIPTION OF THE DRAWINGS

FIGS. (1a) and (1b) are perspective views showing a small article holder according to the first embodiment of the present invention.

Figures 4A, 4B:
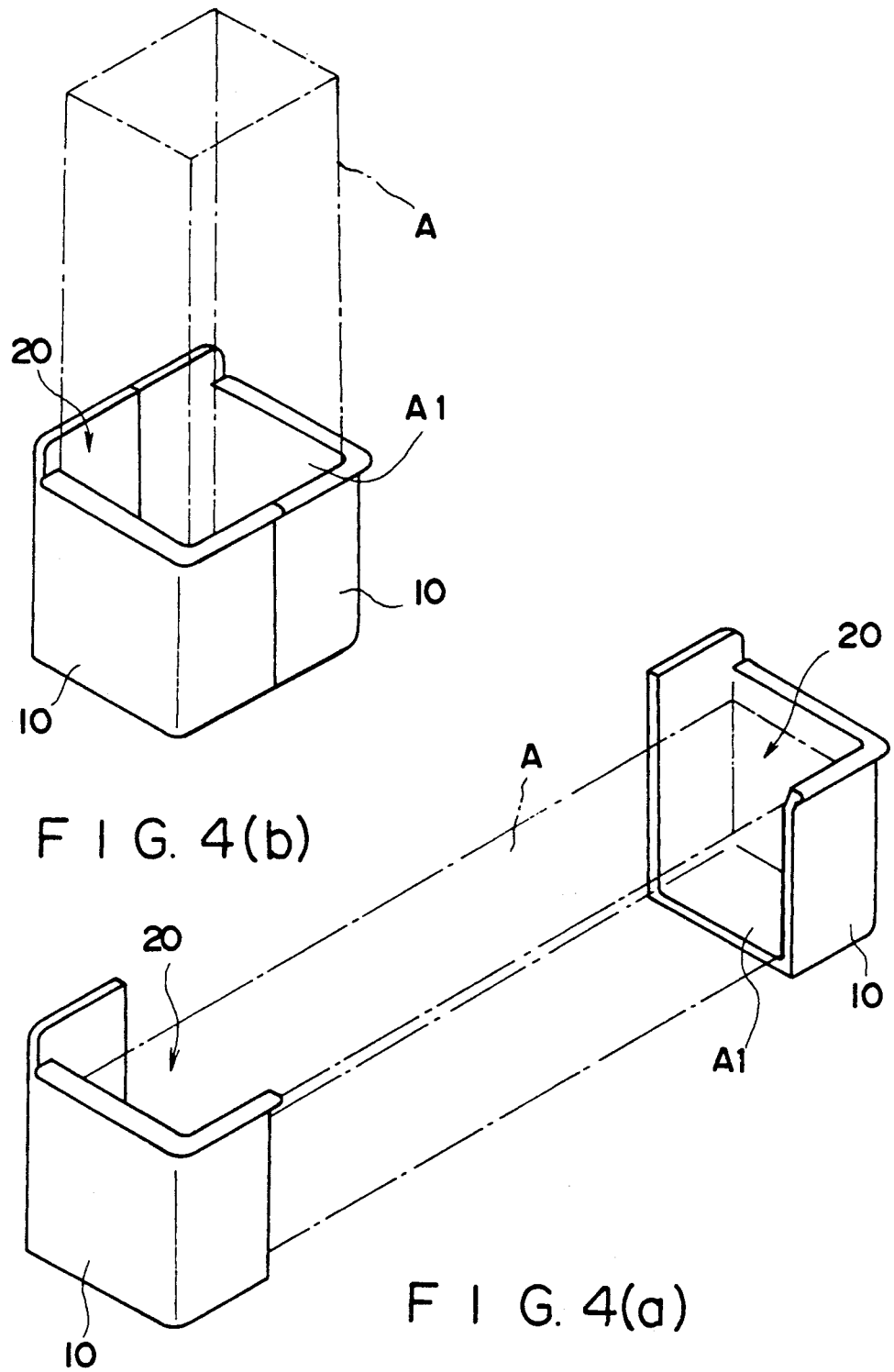
Figure 9:
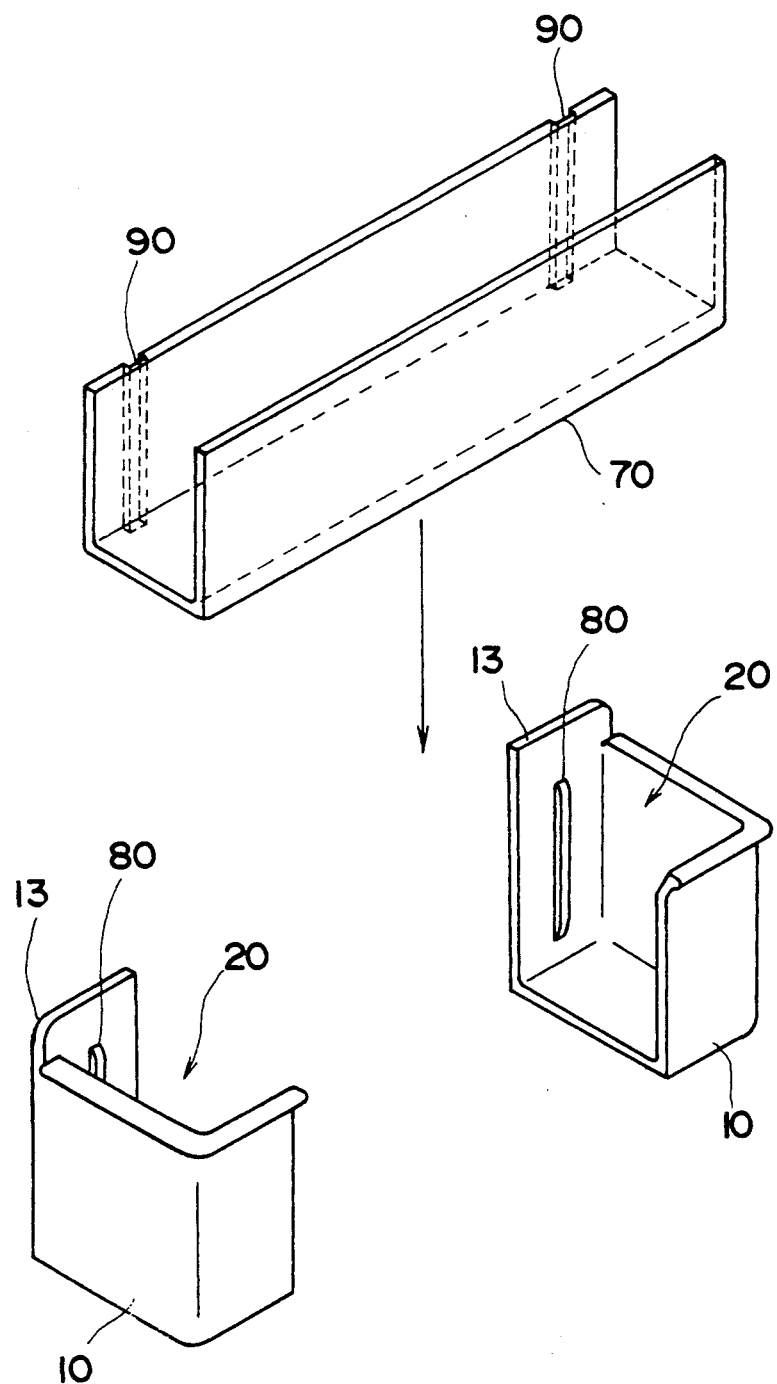
Figure 10B:
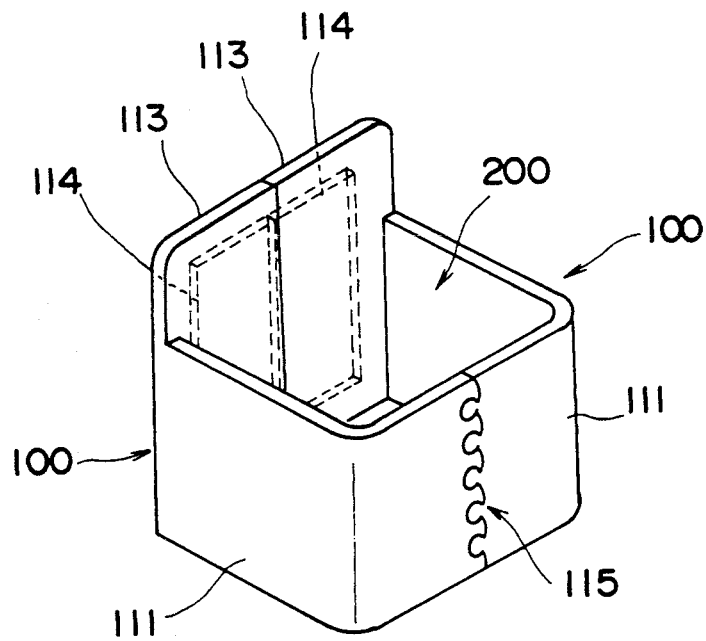
Figure 10A:
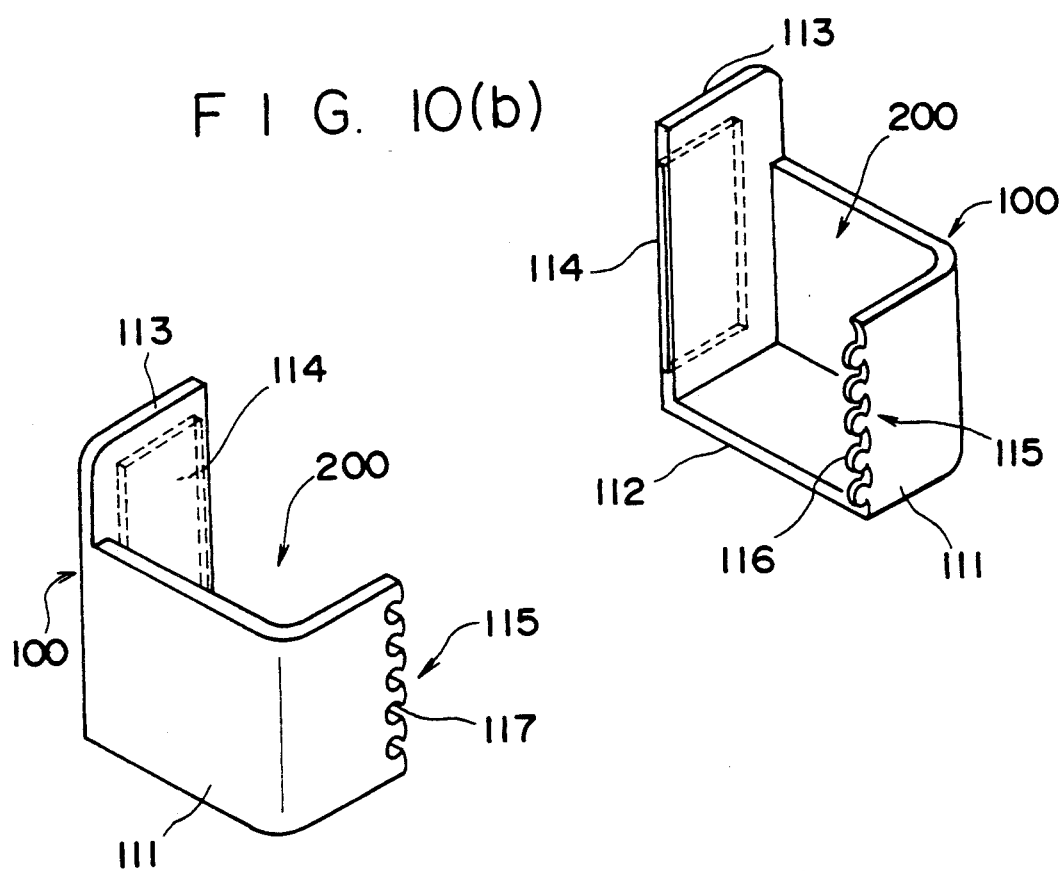
Figure 11:
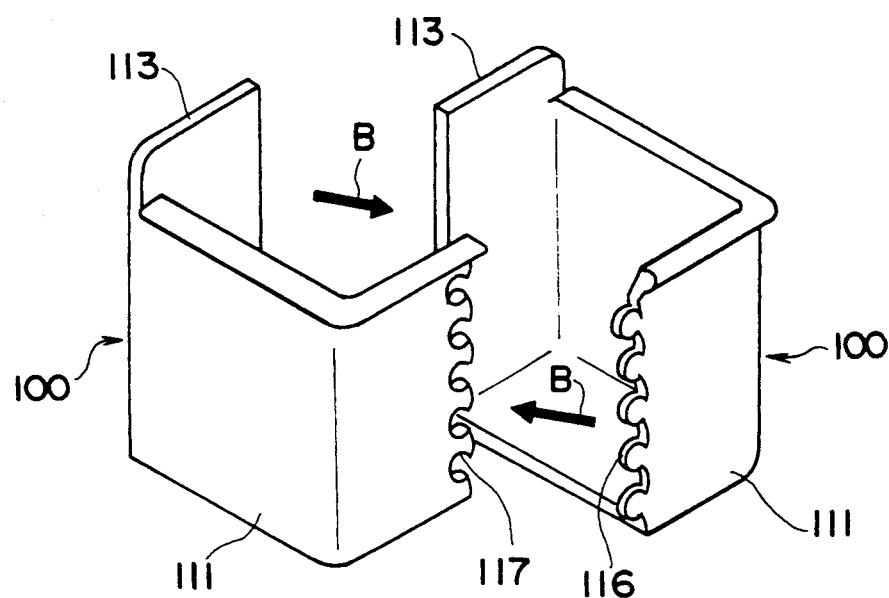
Figure 12:
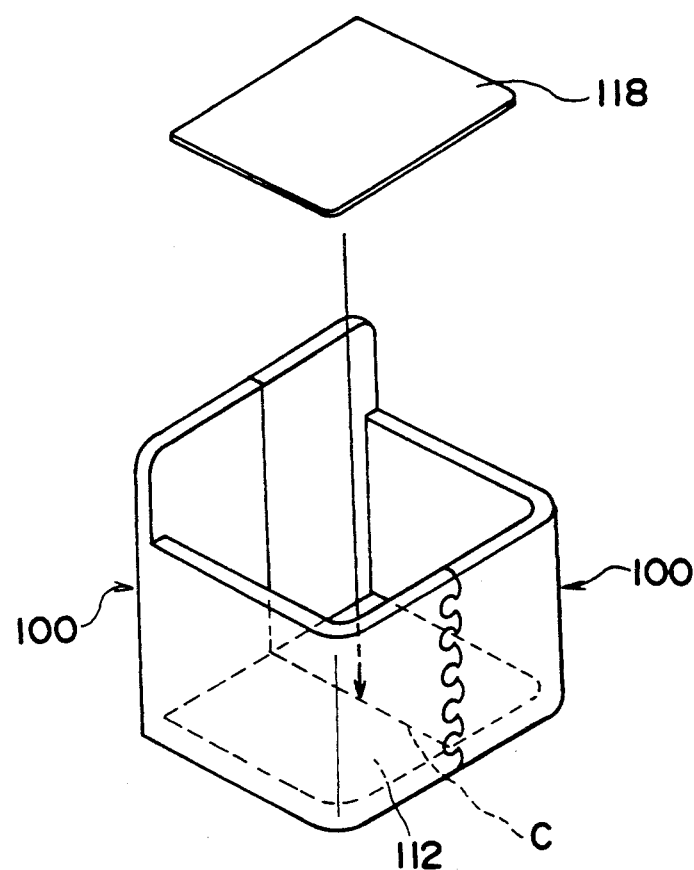
Figure 13B:
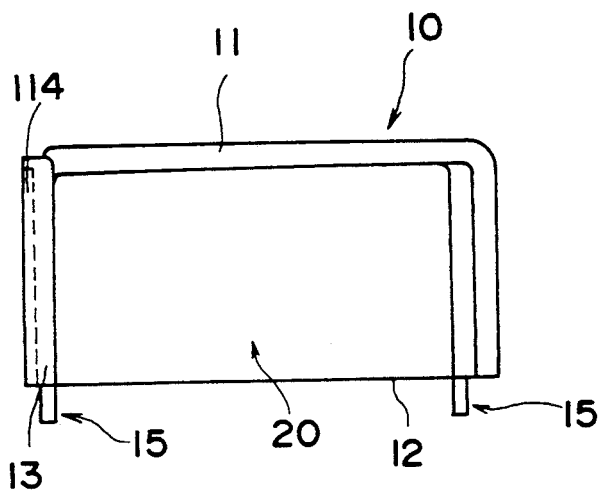
Figure 13A:
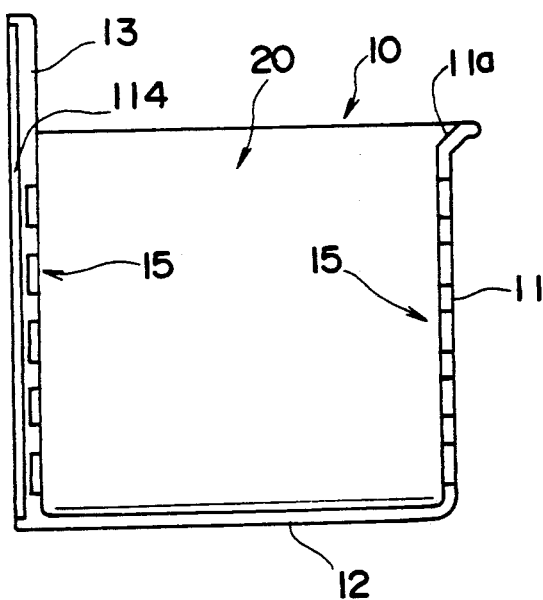
Figure 13C:
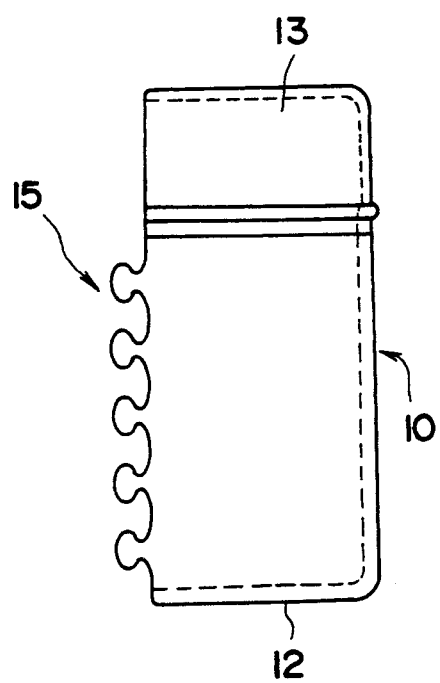
Figure 19:
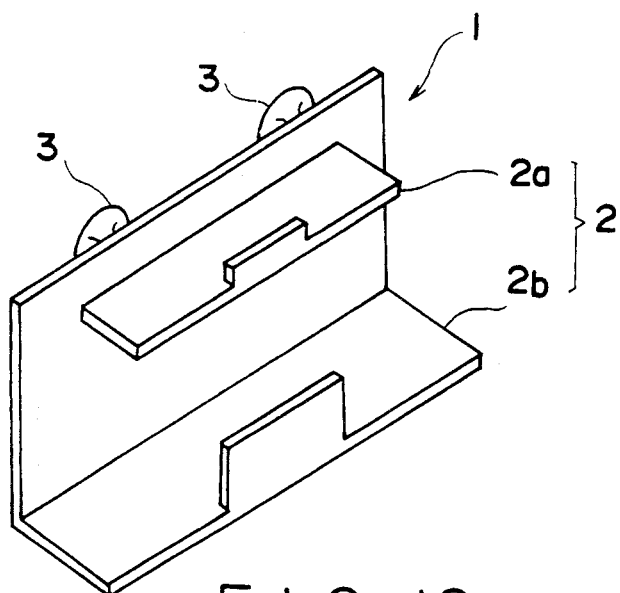
Figure 20:
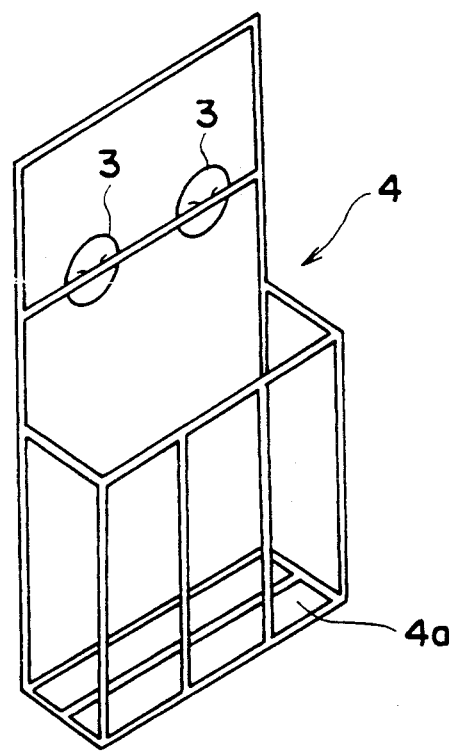

FIGS. (3a) to (3c) are a front view, a top plan view, a right side view of one piece of the holder bodies according to the second embodiment of the present invention, respectively;

FIGS. (4a) and (4b) are perspective views showing the small article of the second embodiment in use;

FIGS. (5a) and (5b), and (6a) and (6b) are front views showing a small article holder supporting a wrapping film case A of different length, respectively;

FIGS. (7a) and (7b) are perspective views of a small article holder according to the third embodiment of the present invention;

FIG. 8 is a perspective view of a small article holder according to the fourth embodiment of the present invention;

FIG. 9 is a perspective view of a small article holder which is modified from the holder as shown in FIG. 4;

FIGS. (10a) and (10b) are perspective view of a small article holder according to the fifth embodiment of the present invention;

FIG. 11 shows a case where a pair of holder bodies are engaged with each other according the fifth embodiment;

FIG. 12 is a perspective view showing a case where a bottom plate is mounted in the fifth embodiment;

FIGS. (13a) to (13c) are a front view, a top plan view and a right side view of one piece of the holder bodies of the small article according to the sixth embodiment of the present invention, respectively;

FIGS. (14a) and (14b) are perspective views showing the holder of the sixth embodiment in use;

FIGS. (15a) and (15b), and (16a) and (16b) are front views showing a case where a wrapping case of different length is held in the sixth embodiment;

FIGS. (17a) and (17b) are perspective views of a small article holder according to the seventh embodiment of the present invention;

FIGS. (18a) and (18b) are perspective views showing a small article of another embodiment of the present invention, and a magnet used in the embodiment, respectively; and FIGS. 19 and 20 are perspective view showing a conventional holder, respectively.

DETAILED DESCRIPTION OF THE INVENTION

EMBODIMENT 1

FIGS. (1a) and (1b) are perspective views showing a small article holder according to the first embodiment of the present invention.

In FIGS. (1a) and (1b), the small article holder of this embodiment comprises a right-and-left pair of holder bodies 100, 100 as shown in FIGS. (1a) and (1b). Each holder body 100 is formed such that a top end and one side end are open so as to form a supporting section 200. The holder body 100 is composed of a side wall section 111, a bottom section 112 and a back section 113. The supporting section 200 is defined by the side wall section 111, the bottom section 112 and the back section 113. The supporting section 200 is formed large enough to be able to hold a small article to be held.

The back section 113 is formed higher than the side wall section 111, and is provided with a plastic magnet 114, as means for securing the holder body 100 to a fixed structure (not shown). As used herein, the term "fixed structure" means a wall surface of a refrigerator, a steel-made product or the like. In this embodiment the magnet 114 is used as securing means; however, other means such as a sucking disc and an adhesive material can be used.

In the case of supporting a long article, as shown in FIG. (1a), a pair of the holder bodies are secured to a fixed structure such that the holder bodies are positioned apart from each other depending upon the length of the long article. The article is supported by the supporting sections 200, 200 of the holder bodies 100, 100, which hold both ends of the article.

Further, in the case of supporting a short article, as shown in FIG. (1b), a pair of the holder bodies are secured to a fixed structure such that the holder bodies are positioned adjacent to each other to support one end of the short article. The short article is held at one end thereof which is put into the holding section 200.

As described above, the small article holder of this embodiment comprises a pair of the holder bodies 100, 100, and thus is capable of holding a small article with the supporting sections 200, 200. Thus, small articles of different length can be securely held by adjusting the distance of the two holder bodies 100, 100 to be secured to a fixed structure.

Figure 1B:
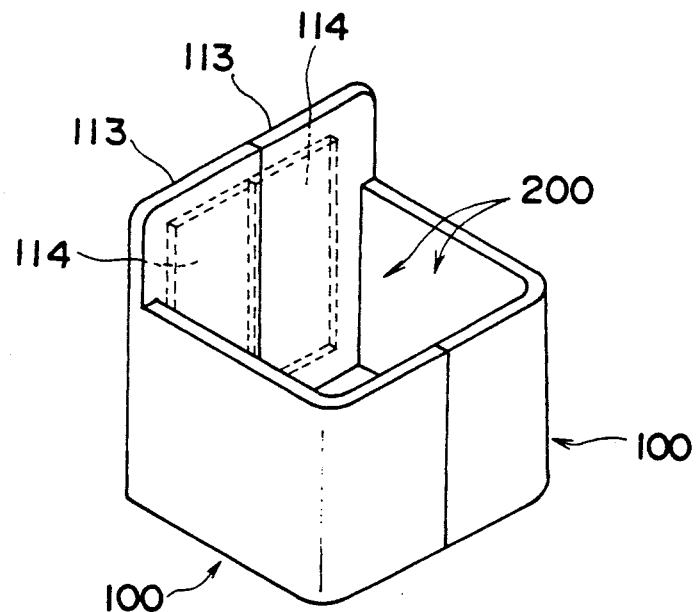
Figure 1A:
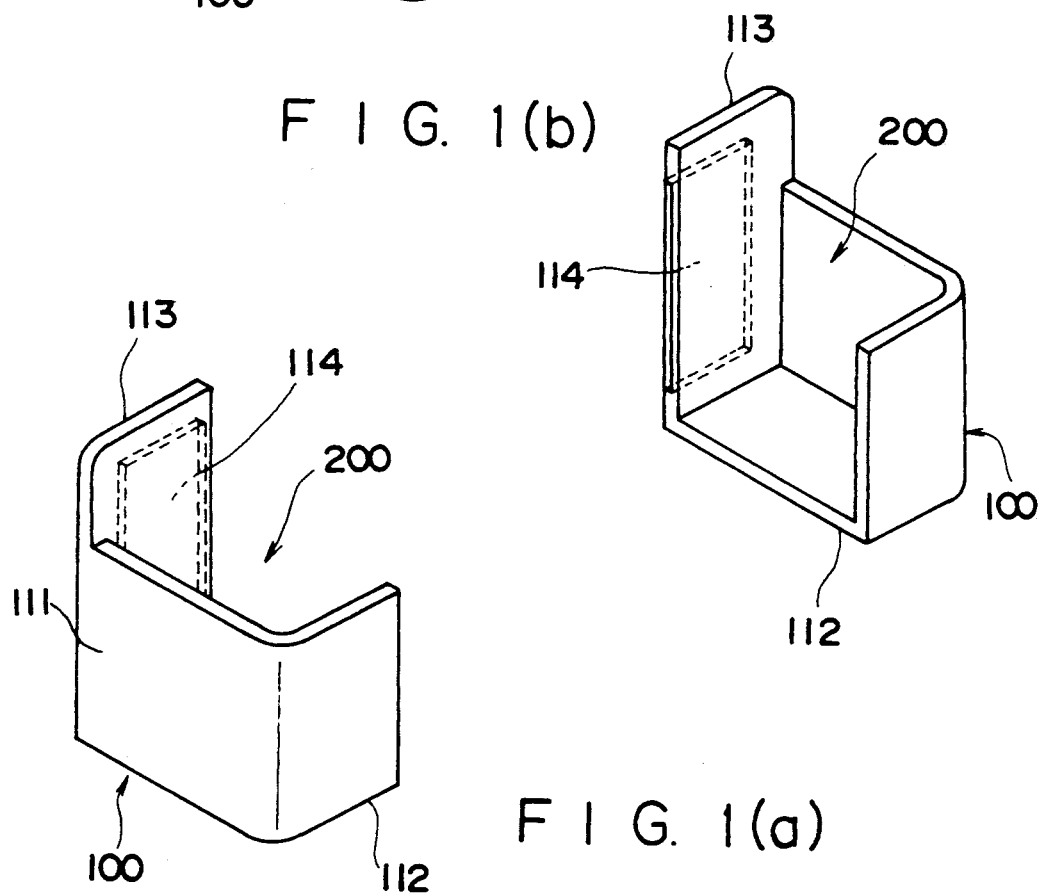
Figure 2:
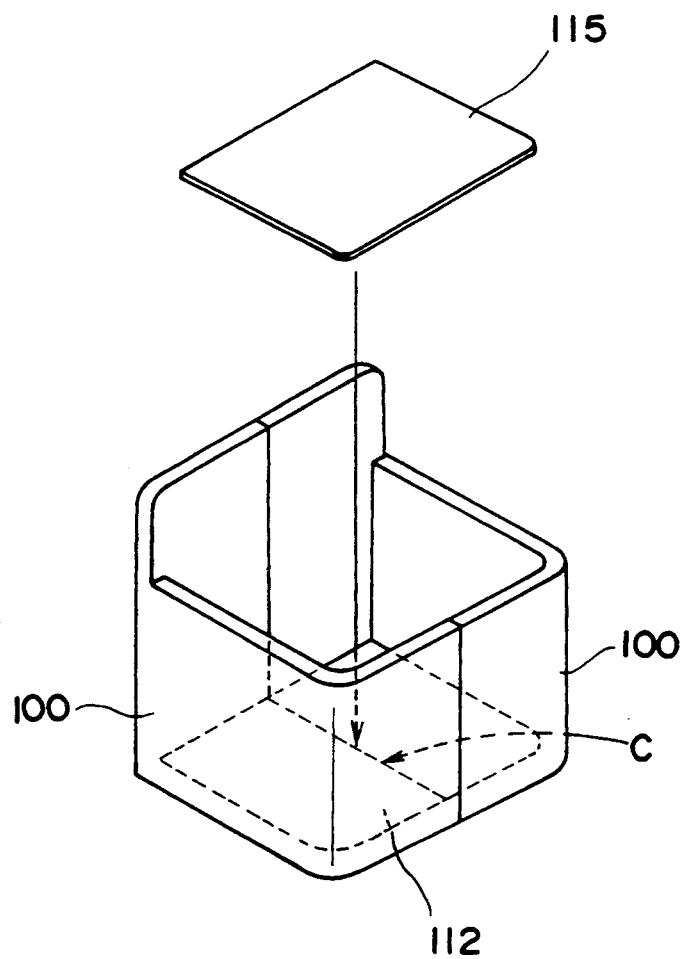
FIG. 2 is a perspective view of the small article as shown in FIGS. (1a) and (1b) where a bottom plate is mounted.
Figure 3B:
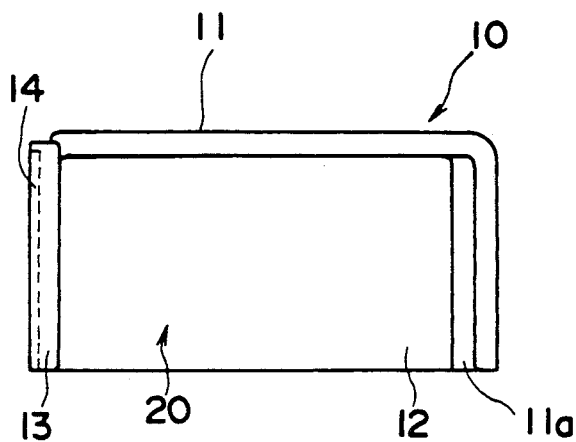
Figure 3A:
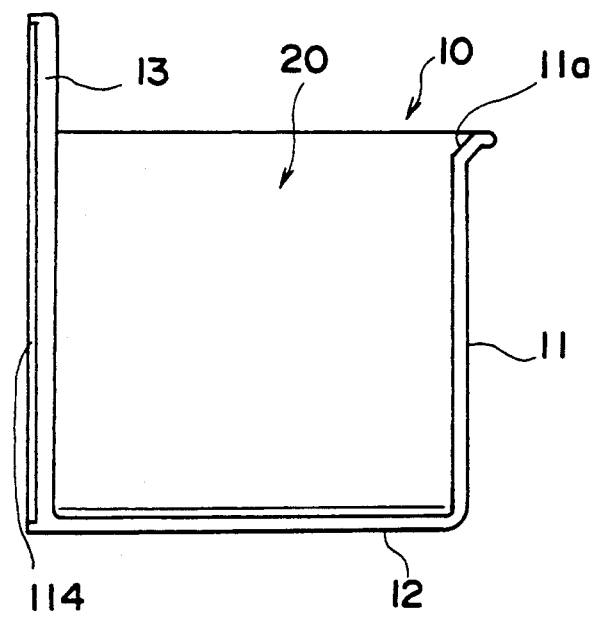
Figure 3C:
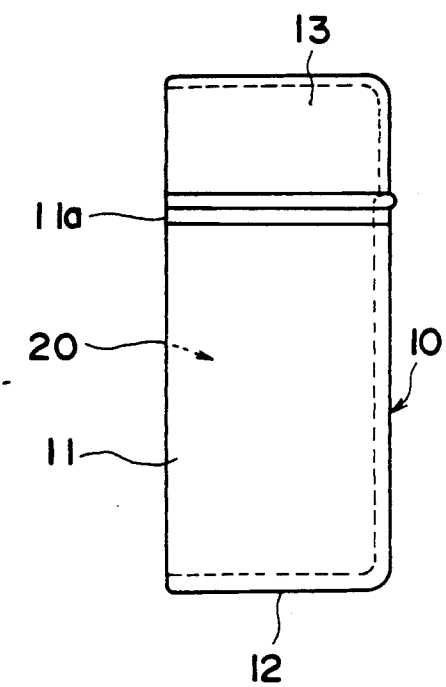

In addition, when the two holder bodies 100, 100 are in contact as indicated in FIG. 2, if a bottom plate 115 is placed on bottom sections 112, 112, such articles as scissors with a sharp point can securely held without a problem such that the scissors are fallen from slit C at the place where the edges of the bottom sections 112, 112 are in contact.

EMBODIMENT 2

FIGS. (3a) and (3b) are a front view, a top plan view, a right side view of one piece of the holder bodies according to the second embodiment of the present invention, respectively; and FIGS. (4a) and (4b) are perspective views showing the small article of the second embodiment in use. This embodiment shows a holder adapted to hold a wrapping film case as small article.

In FIGS. (3) and (4), the small article holder comprises a pair of the holder bodies 10, 10. Each holder body 10 is formed such that a top end and one side end are open so as to form a supporting section 20. The holder body 10 is composed of a side wall section 11, a bottom section 12 and a back section 13. The supporting section 20 is defined by the side wall section 11, the bottom section 12 and the back section 13. As can be seen from FIGS. (4a) and (4b), the supporting section 20 is formed so as to hold one end (A1) of a wrapping case A. In addition, the supporting section 20 may be formed so as to hold a plurality of wrapping film cases.

The upper edge 11a of the side wall 11 is inclined, as indicated in FIG. (3a), so as to make the opening larger, resulting in easiness of placing and displacing of the wrapping case A. The bottom section 12 is somewhat inclined toward the left-side opening as shown in FIG. (3c).

As is the same case with the first embodiment, the back section 13 is formed higher than the side wall section 11, and is provided with a plastic magnet 114, as means for attaching the holder bodies 10 to a fixed structure (not shown). In this embodiment the magnet 114 is used as attaching means; however, other means such as a sucking disc and an adhesive material can be used.

The small article holder of this embodiment comprises a pair of the holder bodies 10, 10. As shown in FIGS. (4a) and (4b), the wrapping film case is held at one end or both ends thereof by the supporting sections 20, 20.

Thus, in the case of supporting the wrapping film case A in a horizontal position, as shown in FIG. (4a), a pair of the holder bodies 10, 10 are secured to a fixed structure (not shown) such that the holder bodies 10, 10 spacedly positioned depending upon the length of the wrapping film case A. The wrapping film case A is supported by the supporting sections 20, 20 of the holder bodies 10, 10 capable of receiving and supporting both ends of the wrapping film case.

Further, in the case of supporting the wrapping film case A in a vertical position, as shown in FIG. (4b), a pair of the holder bodies are secured to a fixed structure (not shown) such that the holder bodies 10, 10 are positioned adjacent to each other to support one end of the wrapping film case.

Figure 5B:
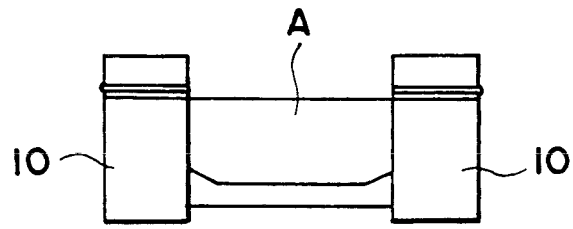
Figure 5A:
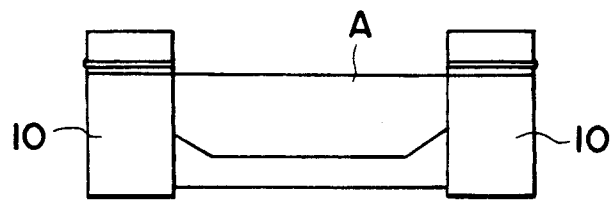
Figures 6A, 6B:
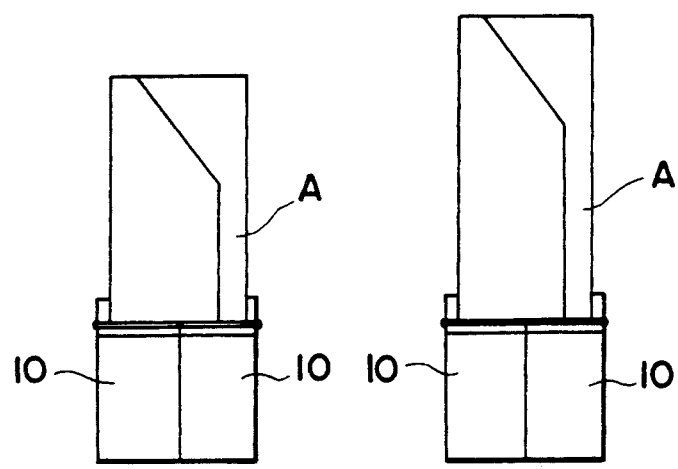

FIGS. 5 and 6 are front views of a small article holder supporting a wrapping film case A of different length, FIG. 5 showing an example of wrapping film case being held in a horizontal direction and FIG. 6 showing an example of wrapping film case being held in a vertical direction, respectively.

In FIGS. (5a) and (5b), in the case of supporting the wrapping film case A in a horizontal direction, the holder bodies are spaced apart a distance which is determined depending upon the length of the wrapping case so as to support both ends of the wrapping case.

In FIGS. (6a) and (6b), in the case of holding the wrapping film case A in a vertical direction, the holder bodies are secured and positioned closely enough to each other to hold one end of the wrapping film case.

As described above, the small article holder of this embodiment comprises a pair of the holder bodies 10, 10 and each holder body 10 is formed with the supporting section 20 which is formed depending upon the size and shape of the wrapping film case so as to hold or support one end or both ends of the wrapping film case. Thus, any wrapping film case with different length, from short to long, can be supported or held by the supporting sections 20, 20 depending upon the size of wall surface of a fixed structure.

In addition, in this embodiment, a wrapping film case is used as a small article; however, any other kinds of small articles, for example, a rectangular parallel-piped article and a cylindrical article can be supported or held with a slight modification being made to the size and shape of the holder bodies.

EMBODIMENT 3

FIGS. (7a) and (7b) are perspective views of a small article holder according to the third embodiment of the present invention. This embodiment shows a holder adapted to hold a booklet as a small article.

Figures 7A, 7B:
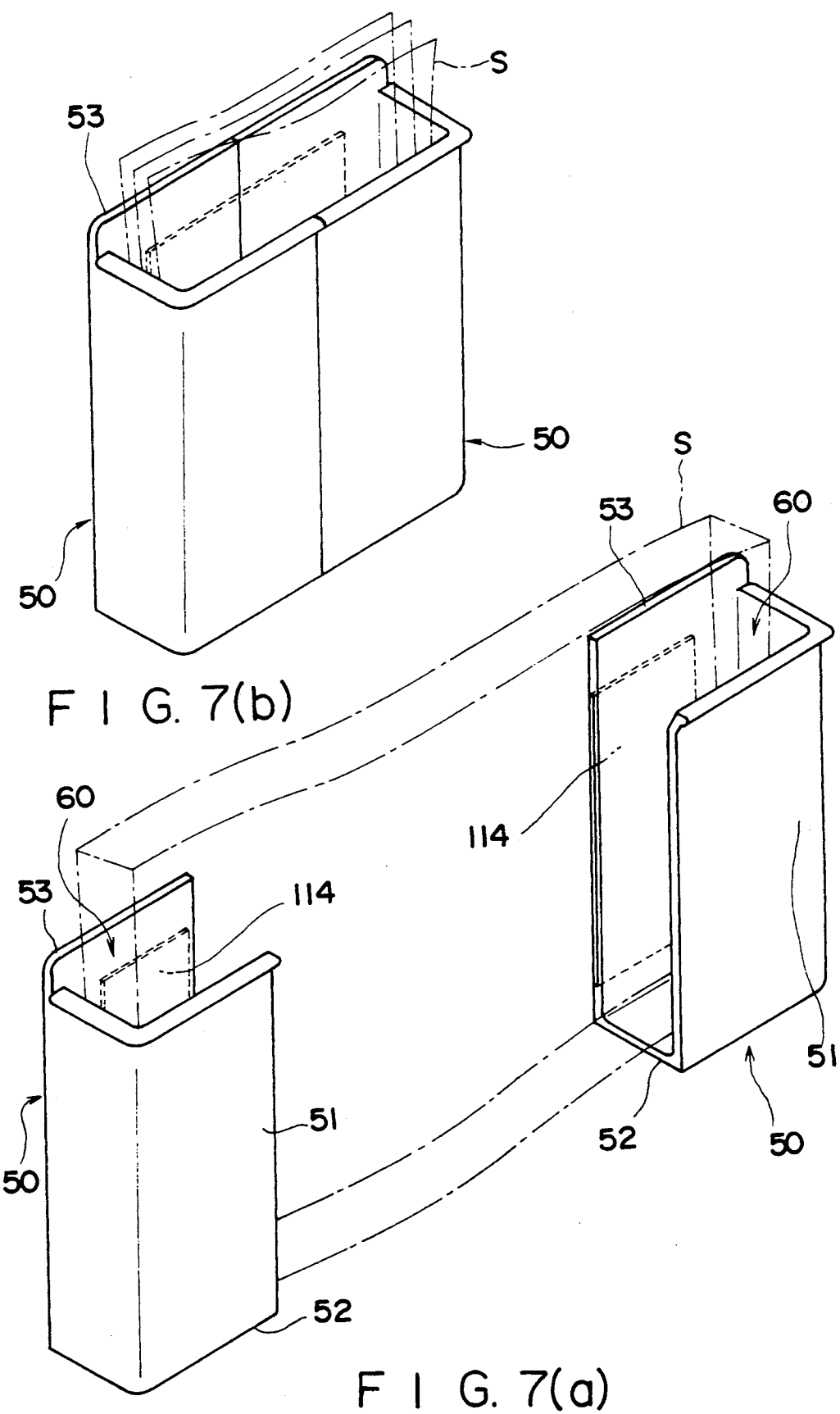

In FIG. 7, the holder comprises a pair of holder bodies 50, 50, as is the same case with the above embodiments. Each holder body 50 consists of a side wall section 51, a bottom section 52 and a back section 53. The supporting section 60 is formed of the side wall section 51 and the bottom section 52 and the back section 53. In this embodiment, the supporting section 60 is formed relatively deep so as to be capable of a holding booklet S such as a cooking notebook or a memo pad.

Further, the back section 53 is provided with a plastic magnet 114, on its back side, as means for attaching the holder bodies to a fixed structure (not shown) as is the same case with the above embodiments.

In the case of holding relatively a long booklet S such as a cooking notebook, as indicated in FIG. (7a), a pair of the holder bodies 50 are secured to a fixed structure so as to be spaced apart an appropriate distance depending upon the length of the booklet S. The booklet S is held at both ends thereof by the supporting sections 60, 60 of the holder bodies 50, 50.

In the case of holding a small booklet such as a memo pad, as indicated in FIG. (7b), a pair of the holder bodies 50, 50 are secured to a fixed structure so as to be positioned adjacent to each other. The one end of the small booklet S can be received and held by the pocket formed of the supporting sections 60, 60 of the holder bodies 50, 50.

As described above, the small article holder of this embodiment comprises a pair of the holder bodies 50, 50, each having the supporting sections 60, 60 which are formed deeply enough to hold the small booklet S. Thus, any booklets with different length, from short to long, can be supported or held by the holder of this embodiment.

EMBODIMENT 4

FIG. 8 is a perspective view of a small article holder according to the fourth embodiment of the present invention. This embodiment shows a holder adapted to hold various kinds of kitchen gadgets as a small article.

In this figure, this embodiment shows a small article holder comprising a pair of holder bodies 10, 10 as used in the second embodiment, and a bridging member 70 which is bridged between the holder bodies 10, 10.

The bridging member 70 is formed to have a "U"-shaped cross section and also is formed so as to fit supporting sections 20, 20 of the holder bodies 10, 10. The bridging member 70 is detachably placed between the holder bodies 10, 10. The cross sectional shape of the bridging member 70 is not limited to the "U"-shape, but includes a "L"-shape, a "J"-shape, an arc-like shape and the like.

In this embodiment, the installation of the bridging member 70 to be positioned between the holder bodies 10, 10 results in the formation of the pocket with certain size. In addition, if several kinds of the bridging members 70 with different length are available, a layout of a kitchen area can be modified as desired.

FIG. 9 shows a perspective view of a small article holder comprising a bridging member having fitting or engaging means.

In this figure, each holder body 10 has projection 80 which is formed in a back section 13 in a vertical direction. The bridging member 70 has "U"-shaped grooves 90, each groove 90 being formed in a place which corresponds to the position of the corresponding projection 80 so as to have the grooves 90 engaged with the corresponding projections 80. These projections 80 and the grooves 90 form the engaging means.

Thus, when the bridging member 70 is to be installed between the holder bodies 10, 10, the bridging member 70 is inserted downwardly to the holder bodies 10, 10 in such a manner that the grooves 90 are engaged with the projections 80.

In this embodiment, the connection of the bridging member 70 and the holder bodies 10, 10 can be secured due to the engagement of the projections 80 and the grooves 90. Thus, this results in the restraint of the slippage between the bridging member 70 and the holder bodies 10, 10 caused by vibration at the time of placing and displacing of small articles.

EMBODIMENT 5

FIGS. (10a) and (10b), and 11 show perspective views of a small article holder according to the fifth embodiment of the present invention.

The features of this embodiment reside in that engaging means 115 for securely fitting or engaging a pair of holder bodies 100, 100 is formed in each of the holder bodies 100, 100 at a place which faces each other.

The engaging means 115 are formed at the edge of side wall sections 111, 111 which faces each other. The engaging means 115 is formed of a plurality of projections 116 and recesses 117 which are alternately and consecutively formed, the projections 116 being able to fit the recesses 117.

As indicated in FIGS. 11, a pair of the holder bodies 100, 100 can be detachably engaged with each other by giving a movement in a direction designated by Arrow B depending upon length of a small article to be supported.

According to the structure of this embodiment, in the case of supporting a small article by the holder bodies 100, 100 to be positioned adjacent to each other, the holder bodies 100, 100 can be securely engaged by means of the engaging means 115. In this case, the slippage between the holder bodies 100, 100 can be prevented, thus resulting in the stable support of the small article.

In addition, as shown in FIG. 12, when the two holder bodies 100, 100 are engaged with each other with a bottom plate 118 being placed on a bottom section 112, such articles as scissors with a sharp point can securely held without a problem such that the scissors are fallen from slit C

EMBODIMENT 6

Figures 14A, 14B:
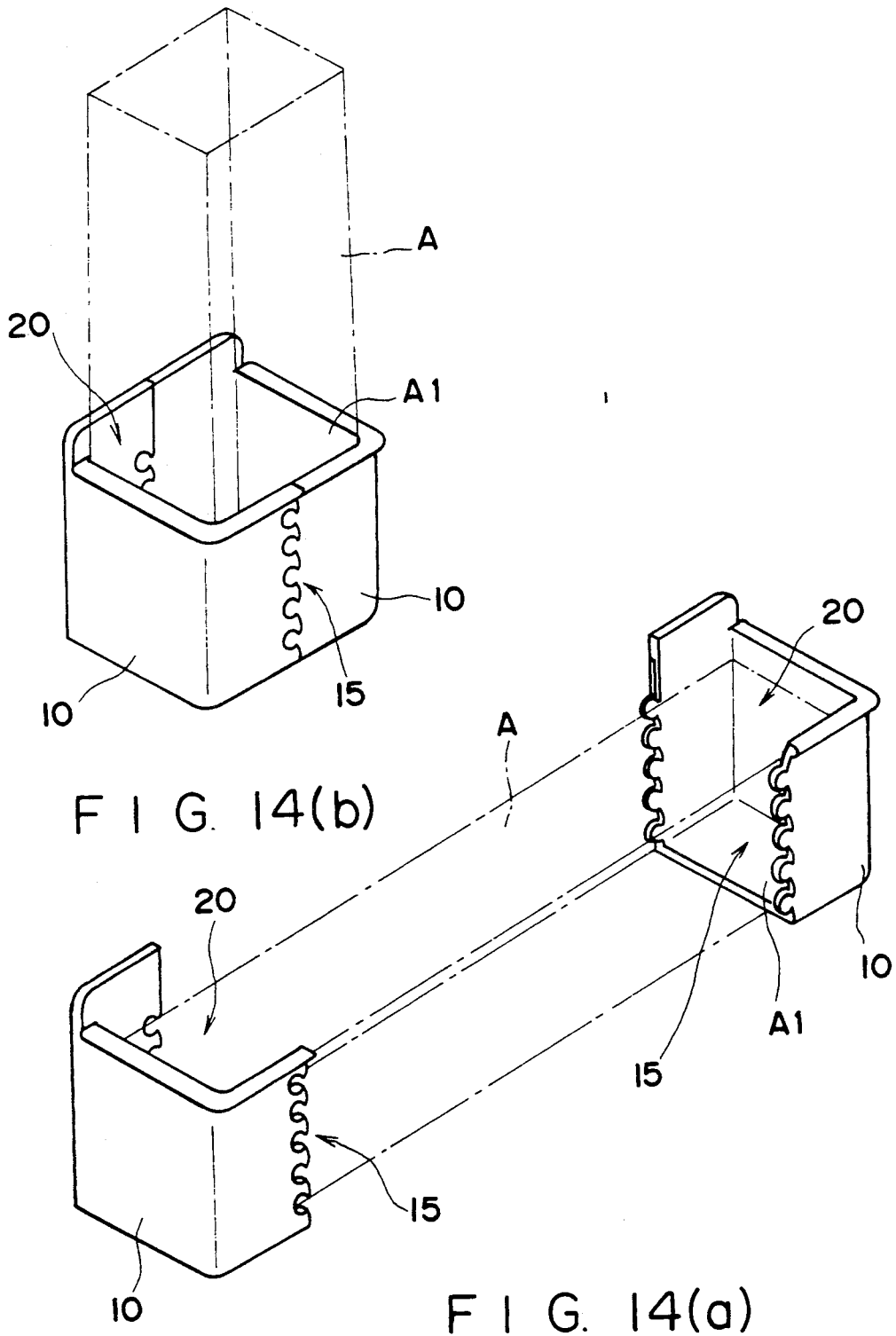
Figure 15B:
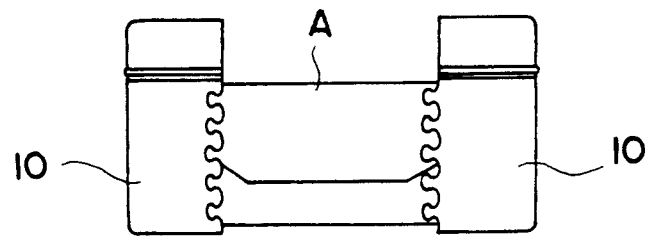
Figure 15A:
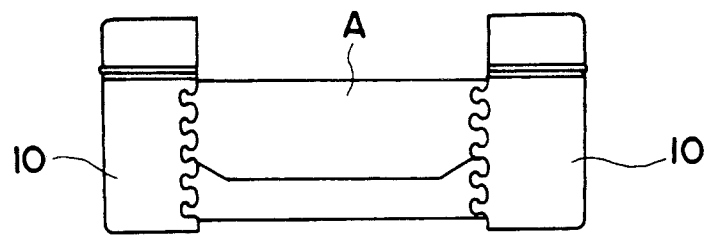
Figures 16A, 16B:
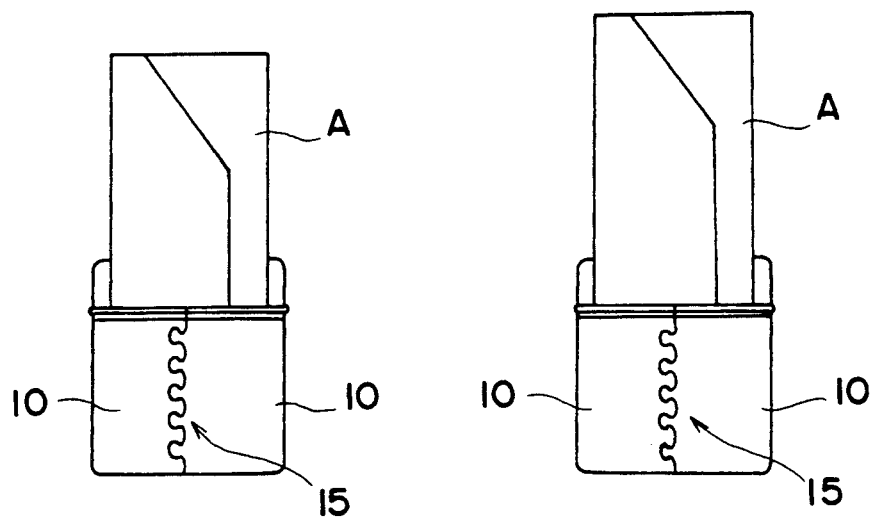

FIGS. (13a) to (13c) are a front view, a top plan view and a right side view of a small article according to the sixth embodiment of the present invention, respectively; and FIGS. 14 to 16 shows the holder of the sixth embodiment in use;

The features of this embodiment reside in that engaging means 15 for securely engaging a pair of holder bodies 10 is formed in each of the holder bodies 10, 10 of the second embodiment (as shown in FIGS. 3 to 6) at a place which faces each other.

The engaging means 15, 15 are formed at the edges of side wall sections 11, 11 of the holder bodies 10, 10, which faces each other. Each engaging means 15 is formed of a plurality of projections and recesses which are alternately and consecutively formed, the projections being able to fit the recesses.

The holder of this embodiment is capable of supporting or holding the wrapping film cases A with different length in both horizontal and vertical directions as indicated in FIGS. 14 to 16.

According to the structure of this embodiment, in the case of supporting a small article in a vertical direction, due to the engaging means formed in the back section 13 as well as in the side wall section 11, the holder bodies 10 can be securely engaged by means of the engaging means 15. In this case, the slippage between the holder bodies 10, 10 can be prevented, thus resulting in the stable support of the small article.

EMBODIMENT 7

FIGS. (17a) and (17b) show perspective views of a small article holder according to the seventh embodiment.

The features of this embodiment reside in that engaging means 55 for securely fitting or engaging a pair of holder bodies 50, 50 is formed in each of the holder bodies 50, 50 of the third embodiment (as shown in FIG. 7) at a place which faces each other.

The holder of this embodiment is capable of supporting or holding booklets with different length and size such as a memo pad, as is the same case with the holder of the third embodiment.

According to the structure of this embodiment, in the case of supporting a small article by the holder bodies 50, 50 to be positioned closely to each other, the holder bodies 50 can be securely engaged by means of the engaging means 55. In this case, the slippage between the holder bodies 50, 50 can be prevented, thus resulting in the stable support of the booklet S.

As described above, the embodiments of the present invention were described; however, the present invention should not be limited to the above embodiments, and can be modified within the gist of the present invention.

Figure 18B:
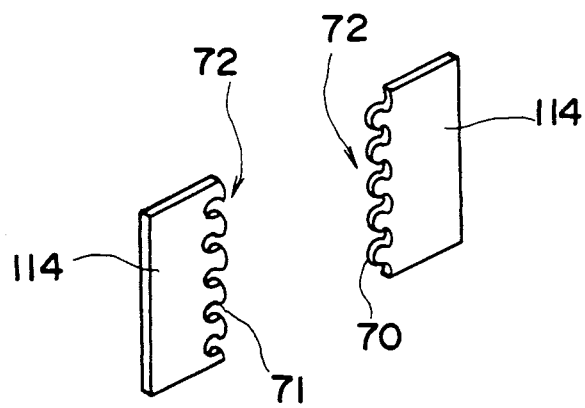
Figure 18A:
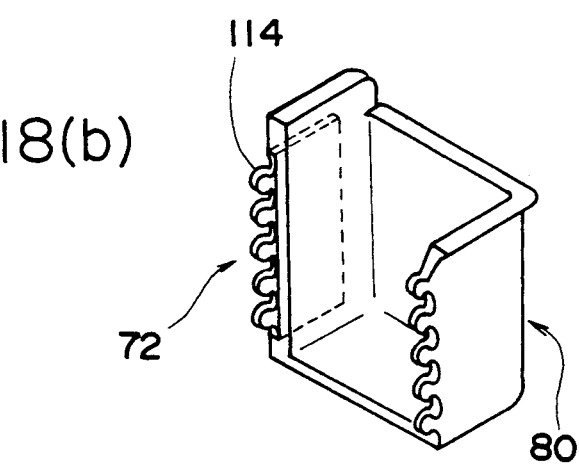
Figure 18A:
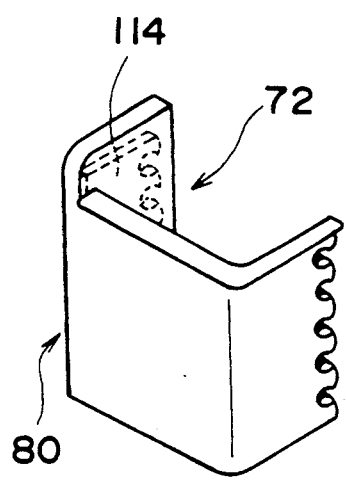

For example, as indicated in FIG. 18, as engaging means, a plurality of projections 70 and a plurality of recesses 71 which can fit each other may be formed in magnets 114, 114 at a place which face each other so as to have a pair of holder bodies 80, 80 engaged with each other.

What is claimed is:

1. An article holder for holding and supporting a container for wrapping film, a book or a kitchen utensil and the like comprising a pair of holder bodies normally disposed in side-by-side relationship, each of said holder bodies having a substantially vertical back section and means on said back section for defining a supporting section upon which at least a portion of an article is supported, said supporting sections each comprising a bottom section and a side wall section upstanding thereon, said bottom sections each having a portion facing each other and said side wall sections upstanding from said bottom sections from portions other than those facing portions, and means on said back section for securing said holder bodies to a fixed structure such that said supporting sections are one of contiguous to support a small article or spaced such that said supporting sections each supports a portion of a larger article.

2. An article holder according to claim 1 wherein the shape and the size of the supporting section are such that the supporting section can support one end of a wrapping film case.

3. An article holder according to claim 1 wherein the shape and the size of the supporting section are such that the supporting section can support one end of a booklet.

4. An article holder according to claim 1 wherein a bridging member having a "U"-shaped cross section is detachably placed between a pair of the holder bodies.

5. An article holder according to claim 1 wherein each of the holder bodies has means for fitting or engaging a pair of the holder bodies to each other in each of the holder bodies at a place which faces each other.

6. An article holder according to claim 1 wherein the securing means is a plastic magnet.

* * * * *